United States Patent [19]

Kurabayashi et al.

[11] Patent Number: 5,012,385
[45] Date of Patent: Apr. 30, 1991

[54] STRUCTURE FOR ARRANGING ELECTRICAL DOUBLE-LAYER CAPACITOR CELLS

[75] Inventors: Ken Kurabayashi, Chigasaki; Yoshinobu Tsuchiya, Fujisawa; Yoriaki Niida, Yamato, all of Japan

[73] Assignee: Isuzu Motors Limited, Tokyo, Japan

[21] Appl. No.: 519,597

[22] Filed: May 7, 1990

[30] Foreign Application Priority Data

Jul. 29, 1989 [JP] Japan .................................. 1-197826

[51] Int. Cl.$^5$ .......................... H01G 4/38; H01G 9/00
[52] U.S. Cl. .................................... 361/328; 361/502
[58] Field of Search ...................... 361/502, 328, 329; 354/288

[56] References Cited

U.S. PATENT DOCUMENTS

| 3,732,795 | 5/1973 | Fukuda et al. | 354/288 |
| 4,317,628 | 3/1982 | Shimizu | 354/288 |
| 4,343,965 | 8/1982 | Deters et al. | 361/328 X |
| 4,616,290 | 10/1986 | Watanabe et al. | 361/328 |

Primary Examiner—Donald A. Griffin
Attorney, Agent, or Firm—Spencer & Frank

[57] ABSTRACT

In a forming an electrical double-layer capacitor by combining a plurality of electrical double-layer capacitor cells, the electrical double-layer capacitor cells are formed not by being laminated in a vertical direction but by being arranged in a horizontal direction, thereby allowing a multiplicity of electrical double-layer capacity cells to be arranged even in the case of a narrow space if only there is a sufficient area.

6 Claims, 4 Drawing Sheets

STRUCTURE FOR ARRANGING ELECTRICAL DOUBLE-LAYER CAPACITOR CELLS

BACKGROUND OF THE INVENTION

1. Field of the Invention

The present invention relates to a structure for arranging large-capacity electrical double-layer capacitor cells within narrow confines of space.

2. Description of the Related Art

An electrical double-layer capacitor has a large capacity as compared with other types of capacitor and has hitherto been used as a power source for backup, or the like.

FIG. 6 illustrates a conventional electrical double-layer capacitor cell (hereinafter simply referred to as the cell in some cases). As shown, a cell C comprises the following components: a collecting electrode 1; a sealing material 2; two electrode layers 3; and a porous separator 4.

The sealing material 2 has a cylindrical configuration, and the porous separator 4 is disposed in a substantially central portion of its interior. The electrode layer 3 is filled on each opposite side of the porous separator 4, and the collecting electrode 1 is placed in such a manner as to cover the surface of the electrode layer 3 and the rim of the sealing material 2.

As the collecting electrode 1, an electrically conductive rubber sheet, for example, may be used, and as the sealing material 2, non electrically conductive rubber, for example, may be used. As the porous separator 4, a polypropylene porous film, for example, may be used. In addition, as the electrode layer 3, paste made by mixing activated carbon particles and dilute sulfuric acid may be used.

FIG. 7 illustrates a conventional electrical double-layer capacitor formed by combining a plurality of cells C having the above described arrangement. As shown, the electrical double-layer capacitor comprises the following components: a case 5; electrode plates 6, 7; terminals 6-1, 7-1; an insulating plate 8; reinforcing plates 9, 10; and the cells C.

The reinforcing plate 9 is connected to the electrode plate 6, while the reinforcing plate 10 is connected to the electrode plate 7 via the case 5. The terminal 6.1 is formed by cutting out a part of the electrode plate 6, while the terminal 7-1 is formed by cutting out a part of the electrode plate 7. The insulating plate 8 is inserted between the electrode plates 6 and 7 to provide insulation therebetween.

If the cells C are simply laminated, the contact resistance of activated carbon particles of the cells C is large, so that the internal resistance of the capacitor is large. Hence, it is common practice to calk the rim of the case 5 at the time of lamination so as to apply pressure to the laminated body, which reduces the aforementioned contact resistance, thereby rendering the internal resistance of the capacitor small.

In the above-described example, pressurization is conducted not at the stage of individual cells but after the lamination thereof. However, in some cases, pressurization processing is effected at the stage of individual cells.

FIG. 8 illustrates a cell of an electrical double-layer capacitor of a button type. As shown, this cell comprises the following components: collecting electrodes 11, 12; two electrode layers 13; a porous separator 14; a sealing material 15; and an insulating material 16.

The collecting electrode 12 is formed into a cylindrical configuration and accommodates therein the electrode layer 13, the porous separator 14, the sealing material 15, etc. This assembly is pressed with the collecting electrode 11 from thereabove, and the rim of the collecting electrode 12 is calked inwardly, thereby fabricating a cell. The calking force of the collecting electrode 12 provides the pressurizing force, thereby rendering the internal resistance small.

FIG. 9 shows an electrical double-layer capacitor in which button-type cells are laminated. In order to obtain a desired voltage, a necessary number of cells are laminated and are accommodated in an outer case 17. In this case, it suffices if electrical contact is secured, and there is no need to provide pressurization.

As described above, in conventional electrical double-layer capacitors, the cells C are disposed by being laminated.

It should be noted that, as a prior-art document concerning electrical double-layer capacitors, for example, Japanese Patent Laid-Open No. 2621/1981 is known.

However, there has been a problem in that if a request is made to install a large-capacity electrical double-layer capacitor within narrow confines of space, it is impossible to meet the request with the conventional way of laminating cells.

For instance, when it is desirous to install an electrical double-layer capacitor within narrow confines of space such as between a pair of inner and outer panels constituting a wall of an automobile, the conventional structure of lamination would result in an increased thickness for the capacitor, thereby making the installing impossible.

SUMMARY OF THE INVENTION

Accordingly, an object of the present invention is to provide a structure for arranging an electrical double-layer capacitor which makes it possible to arrange a multiplicity of electrical double-layer capacity cells even in the case of a narrow space if only there is a sufficient area, thereby overcoming the above-described drawback of the conventional art.

To this end, in accordance with one aspect of the invention, there is provided a structure for arranging an electrical double-layer capacitor cell comprising: a first electrode plate adhered to a surface of a tabular member in an electrically nonconductive manner; an electrical double-layer capacitor cell adhered to the first electrode plate in an electrically conductive manner; and a second electrode plate adhered to the electrical double-layer capacitor cell in an electrically conductive manner.

In accordance with another aspect of the invention, there is provided a structure for arranging electrical double-layer capacitor cells comprising: a first electrode plate adhered to a surface of a tabular member in an electrically nonconductive manner; a plurality of electrical double-layer capacitor cells adhered to the first electrode plate in an electrically conductive manner; and a second electrode plate adhered to the plurality of electrical double-layer capacitor cells in an electrically conductive manner, whereby the plurality of electrical double-layer capacitor cells are connected in parallel with each other.

In accordance with still another aspect of the invention, there is provided a structure for arranging electrical double-layer capacitor cells comprising: a first electrode plate adhered to a surface of a tabular member in an electrically nonconductive manner; a first group and a second group of electrical double-layer capacitor cells adhered to the first electrode plate in an electrically conductive manner; a second electrode plate adhered to the first group of electrical double-layer capacitor cells in an electrically conductive manner; and a third electrode plate adhered to the second group of electrical double-layer capacitor cells in an electrically conductive manner, whereby the first group of electrical double-layer capacitor cells and the second group of electrical double-layer capacitor cells are connected in parallel with each other.

The above and other objects, features and advantages of the invention will become more apparent from the following detailed description of the invention when read in conjunction with the accompanying drawings.

DESCRIPTION OF THE PREFERRED EMBODIMENTS

Referring now to the accompanying drawings, a detailed description will be given of the preferred embodiments of the present invention.

Figure 1:
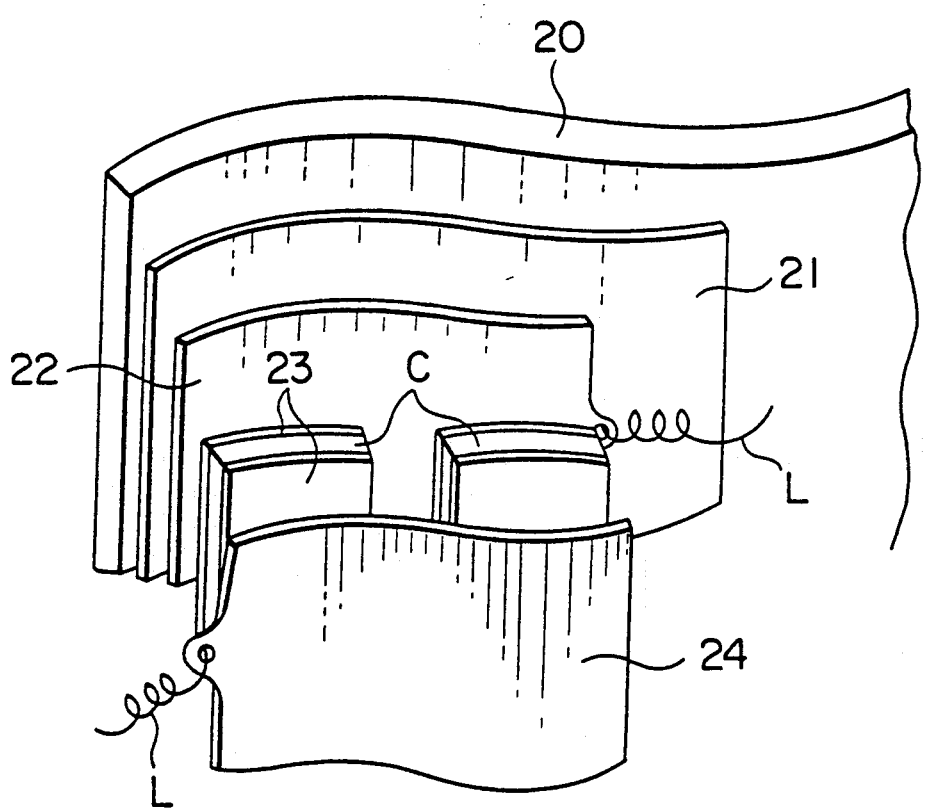
FIG. 1 is an exploded perspective view of a structure for arranging electrical double-layer capacitor cells in accordance with the present invention.
Figure 2:
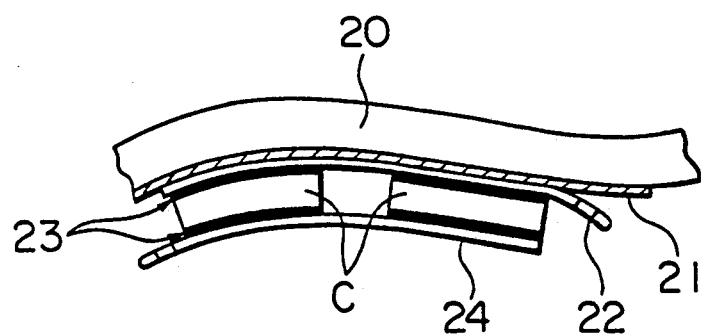
FIG. 2 is a cross-sectional view of the structure for arranging electrical double-layer capacitor cells in accordance with the present invention.

FIG. 1 illustrates an exploded perspective view of a structure for arranging electrical double-layer capacitor cells in accordance with the present invention, and FIG. 2 shows a cross-sectional view thereof. As shown, the structure for arranging electrical double-layer capacitor cells comprises a tabular member 20, an adhesive 21, electrode plates 22, 24, an electrically conductive adhesive 23, a cell C, and lead wires L.

A tabular member 20 is, for instance, a panel constituting a wall of an automobile. First, the electrode plate 22 is adhered to a surface of the tabular member 20 by means of the adhesive 21. Then, the cells C are adhered to the electrode plate 22 by means of the electrically conductive adhesive 23. Finally, the electrode plate 24 is adhered to the cells C by means of the electrically conductive adhesive 23. Furthermore, an electrically nonconductive tabular member having the same curved surface as that of the tabular member 20 may be pressed against the electrode plate 24, as necessary. The lead wires L are led out from the electrode plates 22, 24.

When there is an electrically conductive appliance nearby, in order to avoid contact therewith, it is preferable to have the assembly coated or covered with an insulating material after the adhesion of the respective parts.

In the present invention, the cells C are arranged not by lamination but by being adhered in a planar manner, so that the thickness of the space required suffices if it is slightly greater than the thickness of one cell C. Accordingly, it is possible to install a large-capacity electrical double layer capacitor even within narrow confines of a space.

As the electrode plates 22, 24, it is possible to use, for instance, a copper plate or a stainless steel plate. In a case where the tabular member 20 has a curved surface, thin electrode plates are desirable so that they can be adhered in close contact with the curved surface.

It should be noted that if the tabular member 20 is formed of an electrically conductive material, an electrically nonconductive material is used as the adhesive 21.

Although in the above-described embodiment the arrangement is such that two cells C are connected in parallel between the electrode plates 22 and 24, the relationship of connection of the cells C can be determined, as required, at the time of arrangement thereof, as will be described later.

Figure 3:
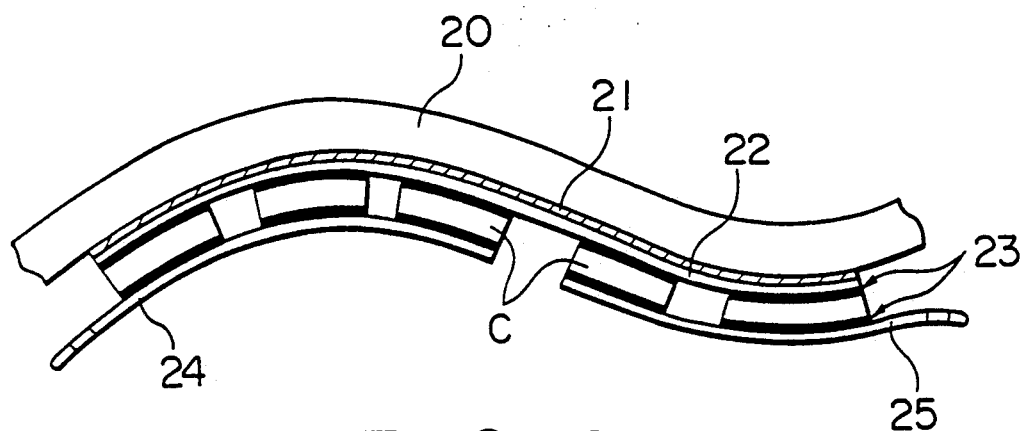
FIG. 3 is a diagram illustrating an arrangement of series-parallel connection in the structure for arranging electrical double-layer capacitor cells in accordance with the present invention.

FIG. 3 illustrates an arrangement of series-parallel connection of a structure of arrangement in accordance with another embodiment of the present invention. The reference numerals correspond to those of FIG. 1, with the exception of reference numeral 25 which denotes another electrode plate.

The three cells C to which the electrode plate 24 is adhered are connected in parallel with each other, and the two cells C to which the electrode plate 25 is adhered are also connected in parallel with each other. These two parallel-connected bodies are connected in series via the electrode plate 22 used in common.

Figure 4:
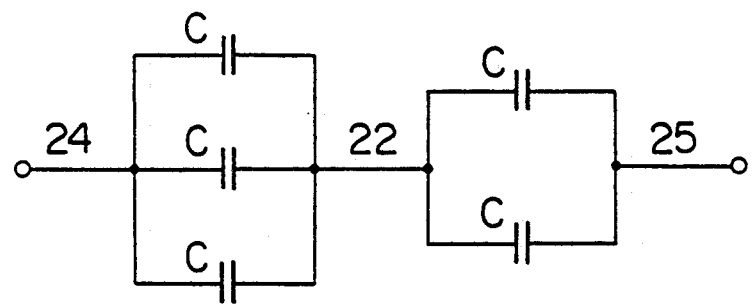
FIG. 4 is an equivalent circuit of FIG. 3.

Accordingly, an equivalent circuit becomes like the one shown in FIG. 4, and it is possible to obtain a capacitor of a desired withstand voltage and a desired capacity. Reference numerals 22, 24, 25 in FIG. 4 correspond to those of FIG. 3.

Figure 5:
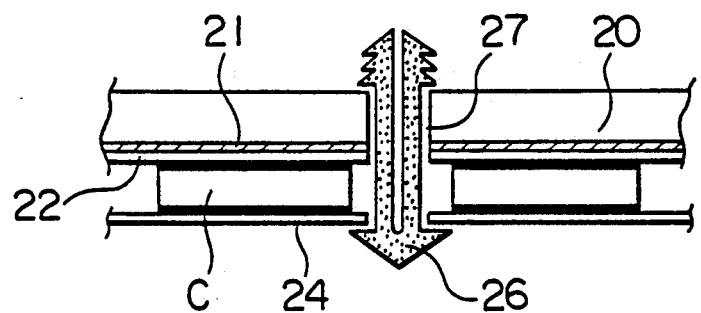
FIG. 5 is a diagram illustrating a means of firmly installing the cells on a tabular member.
Figure 6:
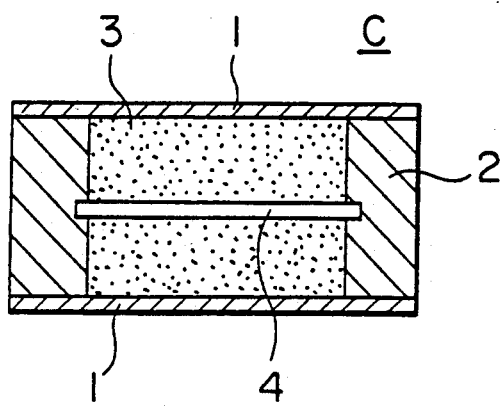
FIG. 6 is a diagram illustrating a conventional electrical double-layer capacitor cell.
Figure 7:
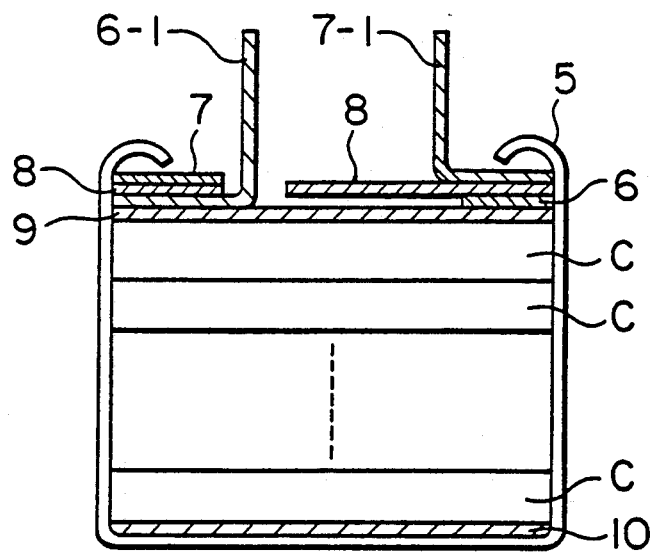
FIG. 7 is a diagram illustrating a conventional electrical double-layer capacitor.
Figure 8:
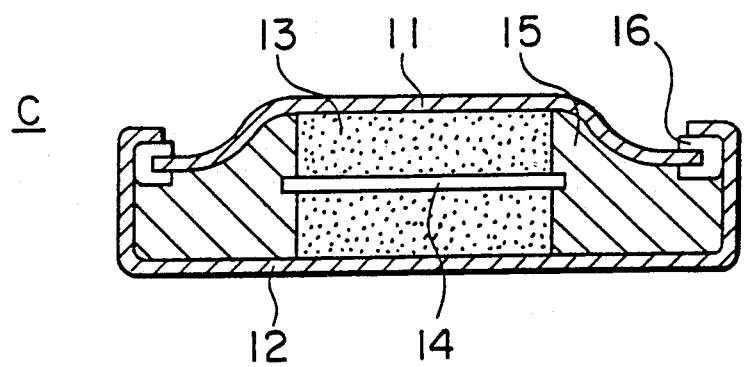
FIG. 8 is a diagram illustrating a button-type cell.
Figure 9:
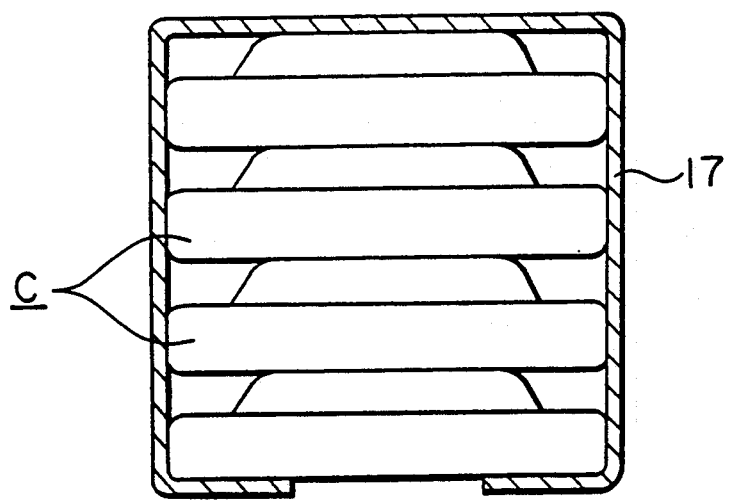
FIG. 9 is a diagram illustrating an electrical double-layer capacitor in which button-type cells are laminated.

FIG. 5 is a diagram illustrating a means for firmly adhering the cell C to the tabular member 20. Reference numerals in this drawing correspond to those of FIG. 1 with the exception of numeral 26 which denotes a retainer and numeral 27 which denotes a hole.

The hole 27 is provided in such a manner as to avoid the cells C and extend through the tabular member 20 and the electrode plates 22, 24. The retainer 26 is pushed into the hole 27 so as to retain the respective members with the electrode plate 24 pressed toward the tabular member 20.

As a result, the adhesion of the cells C to the tabular member 20 is further strengthened, and a pressing force against the cells C increases, thereby reducing the internal resistance of the capacitor.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A structure for arranging an electrical double-layer capacitor cell comprising:
   a first electrode plate adhered to a surface of a tabular member in an electrically nonconductive manner;
   an electrical double-layer capacitor cell adhered to said first electrode plate in an electrically conductive manner; and
   a second electrode plate adhered to said electrical double-layer capacitor cell in an electrically conductive manner.

2. A structure for arranging electrical double-layer capacitor cells according to claim 1, further comprising a retaining for adhering said second electrode plate to said tabular member.

3. A structure for arranging electrical double-layer capacitor cells comprising:
   a first electrode plate adhered to a surface of a tabular member in an electrically nonconductive manner;
   a plurality of electrical double-layer capacitor cells adhered to said first electrode plate in an electrically conductive manner; and
   a second electrode plate adhered to said plurality of electrical double-layer capacitor cells in an electrically conductive manner,
   whereby said plurality of electrical double-layer capacitor cells are connected in parallel with each other.

4. A structure for arranging electrical double-layer capacitor cells according to claim 3, further comprising a retainer for adhering said second electrode plate to said tabular member.

5. A structure for arranging electrical double-layer capacitor cells comprising:
   a first electrode plate adhered to a surface of a tabular member in an electrically nonconductive manner;
   a first group and a second group of electrical double-layer capacitor cells adhered to said first electrode plate in an electrically conductive manner;
   a second electrode plate adhered to said first group of electrical double-layer capacitor cells in an electrically conductive manner; and
   a third electrode plate adhered to said second group of electrical double-layer capacitor cells in an electrically conductive manner,
   whereby said first group of electrical double-layer capacitor cells and said second group of electrical double-layer capacitor cells are connected in parallel with each other.

6. A structure for arranging electrical double-layer capacitor cells according to claim 5, further comprising a retainer for adhering said second electrode plate and said third electrode plate to said tabular member.

* * * * *